(12) United States Patent
Lanz et al.

(10) Patent No.: US 11,185,211 B2
(45) Date of Patent: Nov. 30, 2021

(54) DOMESTIC APPLIANCE FOR THE CLEANING OF HOUSEHOLD ITEMS

(71) Applicant: SANHUA AWECO Appliance Systems GmbH, Neukirch (DE)

(72) Inventors: August Lanz, Tettnang (DE); Ulrich Boettger, Kressbronn (DE)

(73) Assignee: SANHUA AWECO Appliance Systems GmbH, Neukirch (DE)

(*) Notice: Subject to any disclaimer, the term of this patent is extended or adjusted under 35 U.S.C. 154(b) by 381 days.

(21) Appl. No.: 16/039,231

(22) Filed: Jul. 18, 2018

(65) Prior Publication Data
US 2019/0021572 A1 Jan. 24, 2019

(30) Foreign Application Priority Data
Jul. 20, 2017 (DE) ...................... 10 2017 116 403.0

(51) Int. Cl.
*A47L 15/42* (2006.01)
*D06F 39/00* (2020.01)
(Continued)

(52) U.S. Cl.
CPC ....... *A47L 15/4217* (2013.01); *A47L 15/4223* (2013.01); *A47L 15/4229* (2013.01);
(Continued)

(58) Field of Classification Search
CPC ............. A47L 15/4217; A47L 15/4223; A47L 15/4229; D06F 39/07; D06F 39/088; F16K 15/03
(Continued)

(56) References Cited

U.S. PATENT DOCUMENTS

| 5,199,455 A | 4/1993 | Diouhy |
| 2005/0224100 A1* | 10/2005 | Maunsell ............ A47L 15/4231 |
| | | 134/56 D |

FOREIGN PATENT DOCUMENTS

| DE | 2 305 678 A1 | 8/1974 |
| DE | 8 704 810 U1 | 7/1987 |

(Continued)

*Primary Examiner* — Levon J Shahinian
(74) *Attorney, Agent, or Firm* — Breneman & Georges

(57) ABSTRACT

A domestic appliance is proposed, in particular a dishwasher (1), a washing machine or similar, with a water supply unit comprising a water supply line (2) for the supply of water, in particular for the supply of drinking water from the drinking water network, wherein the water supply unit has at least one first actuation element (3), in particular a water inlet valve (3) for purposes of opening and/or closing the water supply line (2), wherein a process water unit (8, 9, 10, 11, 12, 14) is provided for the process water of the domestic machine, wherein at least one decoupling unit (5), in particular an air gap (5), is provided between the process water unit and the water supply unit for purposes of decoupling the process water of the domestic appliance from the water supply line (2), in particular from the drinking water network, so that the water supply line (2) comprises at least one first opening (6) designed as a water outflow opening (6), which at least partially eliminates the disadvantages of the prior art, and in particular has a higher operational reliability with regard to disturbances in the water flow. This is inventively achieved, in that at least the water supply line (2) comprises at least one second opening (7), wherein the second opening (7) is designed as an air inflow opening (7) for the inflow of air into the water supply line (2).

9 Claims, 2 Drawing Sheets

Figure 1:
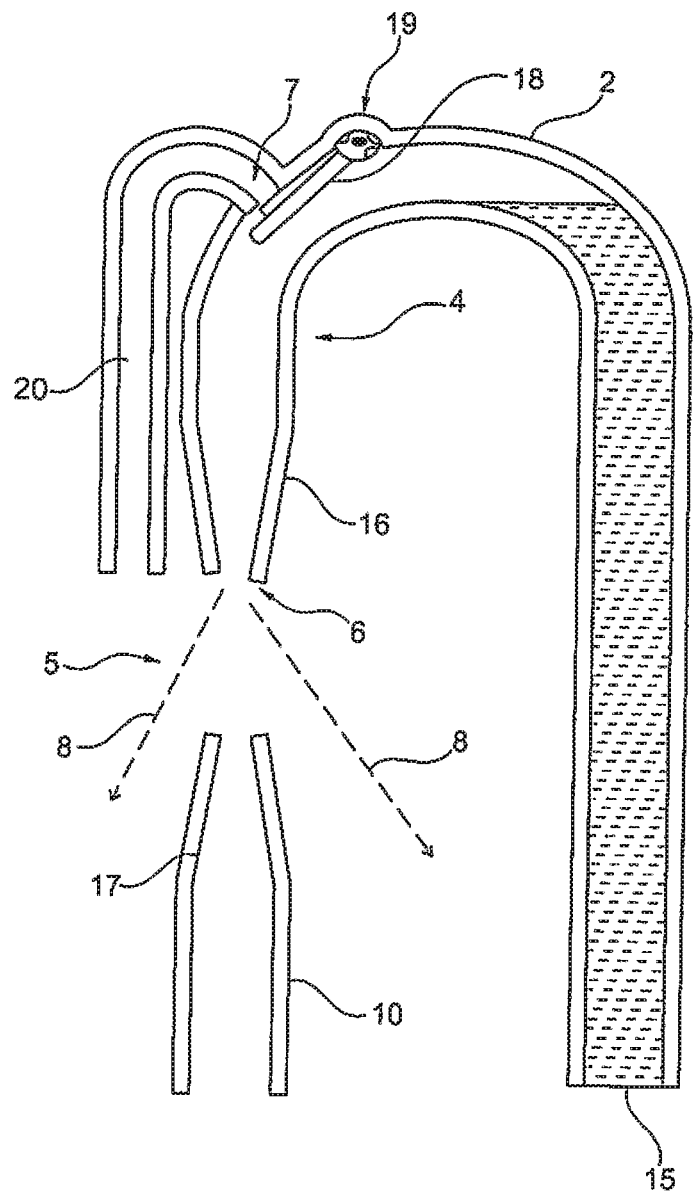

(51) Int. Cl.
*D06F 39/08* (2006.01)
*F16K 15/03* (2006.01)
(52) U.S. Cl.
CPC ............ *D06F 39/088* (2013.01); *F16K 15/03* (2013.01); *D06F 39/007* (2013.01)
(58) Field of Classification Search
USPC .......................... 134/56 D, 57 D, 58 D, 200
See application file for complete search history.

(56) References Cited

FOREIGN PATENT DOCUMENTS

| | | |
|---|---|---|
| DE | 42 16 292 A1 | 11/1993 |
| DE | 195 06 918 A1 | 9/1996 |
| DE | 102 12 250 B4 | 10/2003 |
| DE | 10 2012 216 864 A1 | 3/2014 |
| FR | 2 642 671 A1 | 2/1989 |

* cited by examiner

DOMESTIC APPLIANCE FOR THE CLEANING OF HOUSEHOLD ITEMS

The invention relates to a domestic appliance for the cleaning of household items, in particular a dishwasher, a washing machine or similar, in accordance with the preamble of Claim 1.

PRIOR ART

Domestic appliances already commercially available, in particular dishwashers, washing machines or similar, have a water supply unit comprising a water supply line for the supply of water, in particular for the supply of drinking water from the drinking water network. That is to say, the domestic appliance is provided with a water connection port that is usually connected to the drinking water network, or the public services water network. The said connection is usually implemented in terms of a water hose, which leads into the domestic appliance and internally, i.e. in the interior of the domestic appliance or its housing, is usually connected with an (internal) water line or pipes, and the inflow or supply of water can be controlled by means of an electrically controllable valve or actuation element. That is to say, the supply of water comprises, in particular, the hose including an internal water line, together with a so-called water inflow valve or actuation element.

For reasons of hygiene, the said supply of water must be decoupled or separated from the internal water circuit, that is to say, from the process water, which can become polluted, and thus must be decoupled or separated from the internal process water lines, etc. This is usually implemented in terms of a so-called free air gap.

Accordingly, the water supply, that is to say, the water supply line terminates with a water outflow opening, which is separated and therefore decoupled from the internal line system, in particular, from the water intake opening of the internal water supply system in terms of a (free) air gap, to be bridged by the inflowing water. The said decoupling or system separation is, inter alia, prescribed by law.

Water that flows out of the water outflow opening of the water supply, but does not reach, that is to say, arrive at, the water intake opening of the internal water supply system, i.e. misses the latter, is referred to as so-called spillage water, and is collected internally and used essentially for other tasks in the machine, e.g. for the regeneration of the ion exchange material of a softener. Here a salt brine from a salt container is displaced from the regeneration metering unit by a metered quantity of water, in particular, so-called spillage water stored in a water collection container, and carried into the ion exchanger.

Requirements for dishwashers or domestic appliances, in addition to those for a particularly energy-saving operation, also feature the quantity of incident spillage water, which may not exceed 5% of the inflowing water.

In many cases, the water supply, that is to say, the water supply line with the water outflow opening, has a section that is essentially directed vertically downwards, which is followed by the (free) air gap. When the incoming water is switched off, that is to say, when the flow of water is shut off, water remains in this section due to the properties of the water, in particular the surface tension of the water, i.e. the end section of the water supply line, together with the water outflow opening, remains filled with water. However, some of this water evaporates in the course of time, i.e. over hours, days, or weeks, so that calcareous deposits occur and accumulate primarily at the water outflow opening, especially in the case of hard water.

These disadvantageous deposits tend to deflect the water jet, that is to say, the water flowing out of the water outflow opening, so that spillage water is produced to an increasing extent, i.e. to an increasing extent water at the end of the air gap does not flow into the water intake opening of the internal water supply system, that is to say, the internal line system. This is also linked with a disadvantageous, increased accumulation of non-softened water in the machine, since only the water received by the water intake opening is supplied to the softening process.

OBJECT AND ADVANTAGES OF THE INVENTION

In contrast the object of the invention is to propose a domestic appliance for the cleaning of household items, which at least partially eliminates the disadvantages of the prior art, and in particular has a higher operational reliability with regard to disturbances in the water flow.

On the basis of a device of the type cited in the introduction, the said object is achieved by the features of Claim 1. With the measures cited in the dependent claims advantageous embodiments and developments of the invention are possible.

Accordingly, a device in accordance with the invention is characterized in that at least the water supply line comprises at least one second opening, wherein the second opening is designed as an air inflow opening for the inflow of air into the water supply line.

With the said measure it is ensured that, even after shutting off or closing the water supply line using the first actuation element, or more particularly, the water inlet valve, water does not remain in the water supply line, at least not in the region of the first opening designed as a water outflow opening, i.e. in the region directly upstream of the first opening, that is to say, the water outflow opening. With the aid of the advantageous second opening, that is to say, the air inflow opening, air can flow into the water supply line, so that the water in the water supply line, that is to say, directly upstream of the first opening, that is to say, the water outflow opening, can flow out.

Without the said advantageous second opening, that is to say, the air inflow opening, a certain reduction of pressure has previously been created in the water supply line upstream of the first opening, which, together with the surface tension of the water, inter alia, has prevented the water from flowing out. With the inventive second opening, that is to say, the air inflow opening, air now flows into the water pipe, so that gravity allows the water to flow out of the pipe. This ensures that no stagnant water remains at the first opening and that no calcareous deposits can form due to evaporation, and that no more spillage water is produced. This is effectively prevented by the invention (from the onset).

It is conceivable that the second opening, designed as an air inflow opening, is within the first opening, designed as a water outflow opening, and/or is at least partially encased or surrounded by the first opening, designed as a water outflow opening. For example, an air tube or similar could therefore terminate in the end region of the water supply line, that is to say, in the region of the water outflow opening and could be aligned/arranged in/within or through the water supply line in the direction of the first actuation element. By this means, air can advantageously be conducted/guided/transported "behind" the water outflow opening, in particular by the reduced pressure generated by the weight of the water, so that the water in turn advantageously flows out after the water supply line has been closed by means of the first actuation element. If appropriate, the said air pipe or air line can be designed as a (very thin) capillary air tube, wherein in particular the water flows into the latter only to a limited extent, or possibly not at all, by virtue of its different properties relative to those of the air, e.g. viscosity, etc.

The first opening is preferably designed separately/independently from the second opening, and/or a separation distance is provided between the first opening and the second opening of the water supply line, and/or the second opening, designed as an air inflow opening, is arranged between the first opening, designed as a water outflow opening, and the first actuation element.

By this means an advantageous inflow of air "behind" the water outflow opening can be implemented, so that after closure of the water supply line by means of the first actuation element the water in turn advantageously flows out.

The water supply line advantageously has at least one tapered nozzle section, and/or a water nozzle, comprising the water outflow opening. By this means, an advantageous water jet can be generated so that, for example, hardly any spillage water occurs, that is to say, the inflowing water bridges the (free) air gap of the internal line system to be bridged, that is to say, it reaches the water intake opening of the internal water supply system as an advantageous water jet and for the most part reaches the water intake opening, and can be used internally as process water in the context of the invention, that is to say, continues to flow onwards.

An advantageous variant of the invention, in which the water supply line between the first actuation element and the first opening, designed as a water outflow opening, has at least one line section at least partially aligned in the vertical direction, also improves the water guidance.

The line section preferably comprises at least the nozzle section and/or the second opening, designed as an air inflow opening.

In a particular development of the invention, at least one second actuation element is provided, in particular a closure element/closure valve for purposes of closing and/or opening the second opening, designed as an air inflow opening. By this means it can be ensured that in normal operation, that is to say, when the first actuation element is open, no water, or hardly any water, can escape through the air inflow opening and lead to water losses, that is to say, spillage water.

The second actuation element, in particular the closure element/valve, is preferably designed as a flap that can pivot about a pivot axis, in particular the pivot axis of the flap is arranged on a first end region of the flap, and/or the pivot axis, as viewed in the vertical direction, is arranged at the top of the flap, and/or the pivot axis is arranged between the first actuation element and the second opening. By this means, an advantageous automatic mode of operation of the second actuation element or flap can be realized, on the one hand by means of water pressure, and/or on the other hand by means of gravity.

The second actuation element, in particular the closure element/valve, and/or the flap that can pivot about the pivot axis, is preferably at least partially arranged on an inner wall of the water supply line. Thus, the second actuation element, in particular the closure element/valve, can advantageously be adjusted by means of water pressure as the water flows in, in particular the latter closes the air inflow opening, if appropriate by means of a sealing element or similar.

A first cross-section of the first opening is, for example, larger than a second cross-section of the second opening. By this means it is ensured without much effort that in normal operation, when the first actuation element is open, as little water as possible, or no water, or hardly any water, can escape through the air inflow opening and lead to water losses, that is to say, spillage water.

A duct and/or guide element is advantageously provided on the outside of the air inflow opening and/or the water supply line. The said duct and/or guide element can be designed as an air duct/guide element and/or a water duct/guide element. Thus inflowing air and/or escaping water can be directed and guided. The escaping water can, for example, advantageously be led towards the other spillage water, that is to say, directed/guided towards a spillage water reservoir or similar.

Water softeners are already deployed in domestic appliances, such as dishwashers, for example. In general these have at least one exchange tank, which preferably contains a granular ion exchange material, a salt container, and a storage tank arranged above the salt container, which for purposes of regeneration dispenses a quantity of water into the salt container, wherein brine passes from the salt container into the exchange tank.

The open storage tank has, for example, an overflow and is maintained full at the same level with spillage water from a free air gap. The water displacement takes place, controlled by a solenoid valve or similar, by means of hydrostatic pressure equalization.

In general, such components, in particular, the water storage tank, the air gap, etc. are nowadays already housed in so-called in-feed bags (see, for example, DE 42 16 292), which are usually arranged laterally inside the machine housing so as to save space.

Currently commercially available are so-called in-feed bags, which comprise in one unit the regeneration metering unit, the softener, and the salt container. The said unit is in general integrated into a sidewall of the domestic appliance. The disadvantage here, however, is that to ensure the reliability of the components integrated in the in-feed bag, a relatively high inspection cost is necessary. In addition, a relatively small salt container is often used for space reasons. In addition, the in-feed bag has to be adapted to the very wide variety of types of domestic appliance. Such in-feed bags are of known art, for example, from DE 102 12 250 B4.

An in-feed bag and/or a unit with softener components preferably comprises at least the water supply line, and/or at least partially the water supply unit, and/or the first actuation element, in particular the water inlet valve, and/or at least partially the process water unit, and/or the decoupling unit, in particular the air gap, and/or the first opening, designed as a water outflow opening, and/or the second opening, designed as an air inflow opening, and/or the second actuation element.

EMBODIMENT

An embodiment of the invention is illustrated in the figures and is explained in more detail with reference to the latter.

Figure 2:
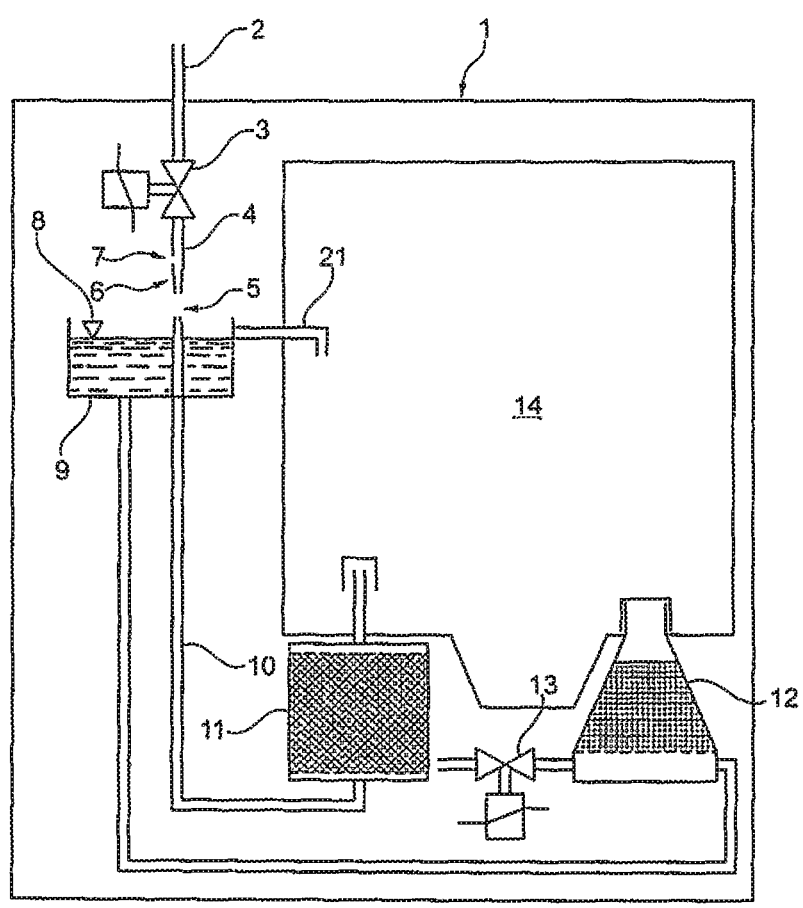

FIG. 1 is a schematic cut away view of a water supply unit for the supply of water from a drinking water network; and FIG. 2 is a diagrammatic illustration of a domestic appliance such as a dishwasher washing machine or similar article with a water supply unit.

DETAILED DESCRIPTION OF THE INVENTION INCLUDING BEST MODE

Referring to FIG. 1 a domestic appliance, in particular a dishwasher 1, washing machine or similar article is illustrated with a water supply unit comprising a water supply line 2 for the supply of water in particular for the supply of drinking water from a drinking water network.

Referring now to FIGS. 1 and 2 the water supply unit as shown in greater detail in FIG. 2 has at least a first actuation element 3 in particular a water valve 3 to open and close the water supply line 2.

A process water unit 8, 9, 10, 11, 12 and 14 as illustrated includes a reservoir/tank 9 for holding spillage water 8 connected to an ion exchanger 11 by an internal water line 10. The ion exchanger 10 is connected to a salt container 12 through a valve 13 which water process unit is disposed in the dishwashing compartment 14. The process water unit 8, 9, 10, 11, 12, is provided to process water for the domestic appliance, wherein at least one decoupling unit 5 in particular an air gap 5 between the process water unit and the water supply unit, for purposes of decoupling the process water of the domestic appliance from the water supply line 2 so that the water supply line 2 has at least a first opening 6, designed as a water outflow opening 6.

The advantages of the invention are obtained by employing a water supply line 2 that has at least one second opening 7 or an air inflow opening 7 for the inflow of air into the water supply line 2.

More particularly the advantages of the invention are achieved where a separation distance is provided between the first opening 6 and the second opening 7 of the water supply line 2 and/or the second opening 7 is an air inflow opening 7 arranged between the water outflow opening 6 and the first actuation element or valve 3.

In a preferred embodiment of the invention the water supply line 2 has at least one tapered nozzle section 16 at the water outflow opening 6.

In a further embodiment of the invention the water supply line 2 between the first actuation element 3 and the first opening or water outflow opening 6 there is at least one line section or end 4 that is at least aligned in the vertical direction.

The line section or end 4 in the preferred embodiment terminates in a nozzle section 16 and/or the second opening 7 is provided as an air inflow opening 7.

The advantages of the invention are further enhanced when at least one second actuation element 18 is provided preferably as a closure element/valve or flap 18, for purposes of closing and/or opening the second opening 7 which preferably is designed as an air inflow opening 7.

The advantages of the invention are further achieved where the second actuation element 18 in particular a closure element/valve 18 is designed as a flap 18 that can be pivoted about a pivot axis 19.

The advantages of the invention are further enhanced when the pivot axis 19 of the flap 18 is arranged on a first end region of the flap 18 and/or the pivot axis 19 is arranged at the top of the flap 18 as viewed in the vertical direction, and/or the pivot axis 19 is arranged between the first actuation element or valve 3 and the second opening or air inflow opening 7.

In a further preferred embodiment the advantages of the invention are achieved when the second actuation element 18, in particular the closure element/valve 18, and/or the flap 18 can pivot about the pivot axis 19 and is at least partially arranged on an inner wall of the water supply line 2.

The advantages of the invention are further achieved when a first cross-section of the first opening or water outflow opening 6 is larger than a second cross-section of the second opening or air inflow 7.

These and other advantages of the invention are within the scope of the following claims.

LIST OF REFERENCE SYMBOLS

1 Dishwasher
2 Water line/supply
3 Valve
4 End
5 Air gap
6 Water outflow opening
7 Air inflow opening
8 Spillage water
9 Reservoir/tank
10 Water line/internal
11 Ion exchanger
12 Salt container
13 Valve
14 Dishwashing compartment
15 Water/residual
16 Nozzle
17 Diffuser
18 Flap
19 Pivot axis
20 Air duct
21 Overflow

What is claimed is:

1. In a domestic appliance with a water supply unit having a water supply line (2) for the supply of water from a drinking water network, wherein the water supply unit has at least a first actuation element (3) to open and close the water supply line (2), wherein
  a process water unit (8, 9, 10, 11, 12, 14) is provided to process water for the domestic appliance, wherein at least one decoupling unit (5) is provided between the process water unit and the water supply unit, for purposes of decoupling the process water of the domestic appliance from the water supply line (2) so that the water supply line (2) has a water outflow opening (6) terminating in a nozzle section, wherein the improvement comprises at least one air inflow opening (7) disposed in the water supply line (2) between the first actuation element (3) and the nozzle section and wherein the at least one air inflow opening (7) is connected to a channel (20) or guide element to guide the inflow of air into the water supply line (2), and wherein
  the water supply line (2) between the first actuation element (3) and the water outflow opening (6) has at least one line section (4) at least partially aligned in the vertical direction to the water outflow opening (6).

2. The domestic appliance according to claim 1, wherein a separation distance is provided between the water outflow opening (6) and the at least one air inflow opening (7) of the water supply line (2), and/or the air inflow opening (7) is arranged between the water outflow opening (6) and the first actuation element (3).

3. The domestic appliance according to claim 1 wherein the nozzle section of the water outflow opening (6) of the water supply line (2) has a tapered nozzle section (16).

4. The domestic appliance according to claim 1 wherein the line section (4) includes the nozzle section (16), and/or the at least one air inflow opening (7).

5. The domestic appliance according to claim 1 wherein an at least one second actuation element (18) or a closure element/valve (18), is provided for closing and/or opening the at least one air inflow opening (7).

6. The domestic appliance according to claim 5 wherein the at least one second actuation element (18) is a flap (18) that can be pivoted about a pivot axis (19).

7. The domestic appliance according to claim 6 wherein the pivot axis (19) of the flap (18) is arranged on a first end region of the flap (18), and/or the pivot axis (19) is arranged at the top of the flap (18), viewed in the vertical direction, and/or the pivot axis (19) is arranged between the first actuation element (3) and the at least one air inflow opening (7).

8. The domestic appliance according to claim 5 wherein the at least one second actuation element (18) is a flap (18) that can pivot about a pivot axis (19), and is at least partially arranged on an inner wall of the water supply line (2).

9. The domestic appliance according to claim 1 wherein a cross-section of the water outflow opening (6) is larger than a cross-section of the at least one an inflow opening (7).

* * * * *